April 24, 1951  W. F. McCANN ET AL  2,549,835
MOBILE GUN CARRIAGE

Filed May 6, 1946  8 Sheets-Sheet 1

Inventors
William F. McCann
Leo H. Johnson

Attorneys

Patented Apr. 24, 1951

2,549,835

UNITED STATES PATENT OFFICE 2,549,835

MOBILE GUN CARRIAGE

William F. McCann, Los Angeles, Calif., and Leo H. Johnson, Peoria, Ill.

Application May 6, 1946, Serial No. 667,554

3 Claims. (Cl. 89—40)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a gun carriage and more particularly to a gun carriage of the type adapted to carry a relatively large caliber gun with a markedly improved degree of mobility.

The speed with which modern warfare travels is far in excess of the heavy artillery arm. Although it is quite possible for light artillery, because of its light weight and hence higher degree of mobility, to maintain supporting contact with advance ground forces, the fire power of such weapons does not provide adequate support and considerable dependence must be placed upon heavy artillery of the caliber of 155 mm. and up. However, experience has shown that heavy artillery of this type is relatively slow moving and the problem of maintaining adequate contact for the support of advance units has been a large one. There is therefore a definite need for a type of heavy artillery capable of maintaining its proper position with respect to the advance units that it supports.

With the foregoing in view, the present invention contemplates and has for its principal object the provision of a gun carriage having a very highly developed degree of cross-country mobility and lending itself admirably to transposition from travelling to firing position and back again in accordance with current tactical needs.

To this end, it is another of the principal objects of the invention to provide a gun carriage in the form of a semi-trailed load in which the weight of the rear portion of the carriage is supported on suitable rolling ground supports, such as bogies or tandem rear wheels, and the weight of the forward portion of the carriage is supported by means of a fifth-wheel structure on a prime mover or the like. In contradistinction to the usual type of mobile gun carriage, the carriage provided according to the present invention utilizes retractable front rolling ground supports instead of a removable limber or similar removable supporting means characteristic of gun carriages heretofore employed. The purpose of the retractable ground supports is to enable the carriage to be self sustaining when unsupported by and disconnected from the prime mover; in addition, the carriage at this time may be easily moved short distances to compensate for adjustments in firing position.

It is a further object of the invention to provide a gun carriage having a high degree of mobility and flotation, these characteristics being accomplished preferably by the use of large wheels and bogies in lieu of endless tracks or the like.

The invention has for another important object the provision of means whereby the carriage may be easily and readily transposed from travelling position to firing position, which result is accomplished by the provision of bed plates, bogie plates and trails, all of which are preferably power-operated. The construction in its preferred form includes a pair of bed plates at the forward end of the carriage, a pair of bogie plates at the rear of the carriage and a pair of rearwardly extendible and forwardly foldable trails likewise at the rear end of the carriage. It is an object of the invention to provide power means for operating the emplacement means either individually or simultaneously so that various degrees of adjustment of the carriage may be accomplished. In this connection the invention accomplishes the support of the rear end of the carriage through the medium of retaining a portion of the weight of the carriage on the bogies.

It is specifically an object of the invention to provide hydraulic means for operating those portions of the emplacement means consisting of the bogie and bed plates and to provide auxiliary manually operable mechanism for the same purpose in the event of failure of the hydraulic means. Another specific object of the invention is to provide power mechanism, preferably mechanical, for the operation of the carriage trails, and to provide as an adjunct to this mechanism auxiliary manually operable means available in the event of malfunctioning of the power mechanism.

It is still another object of the invention to provide a gun carriage comprising a unitary elongated frame of box-like construction, welded throughout, and having its forward portion upwardly and forwardly offset to accommodate a fifth-wheel structure for the support of the forward portion of the carriage on a prime mover or the like. In this respect it is another object of the invention to provide a pintle well at the rear of the carriage for supporting the gun in such manner that during travelling of the gun and carriage the gun tube points forwardly.

It is an important object of the invention to provide trail structure comprising a pair of trails mounted in such manner that the trails, when folded in travelling position, extend forwardly of and parallel to the longitudinal axis of the carriage, one on each side of the forwardly extending gun tube and, when the carriage is emplaced, extend rearwardly of the carriage and diverge or spread to increase the footing provided for the emplaced carriage.

Other objects of the invention are to provide: improved trails of girder construction; improved base plates and spades for the trails; simplified and effective means for locking the trails and gun tube in travelling position; a highly effective bogie construction for supporting the rear of the carriage; mechanism for retracting the front rolling ground supports when the carriage is in travelling position; and a generally improved highly mobile gun carriage capable of travelling at relatively high speeds over varying terrains and under divers tactical conditions.

The foregoing and other important objects and features of the invention will be more readily understood from the following detailed description and accompanying sheets of drawings in which.

GENERAL DESCRIPTION

Figure 1:
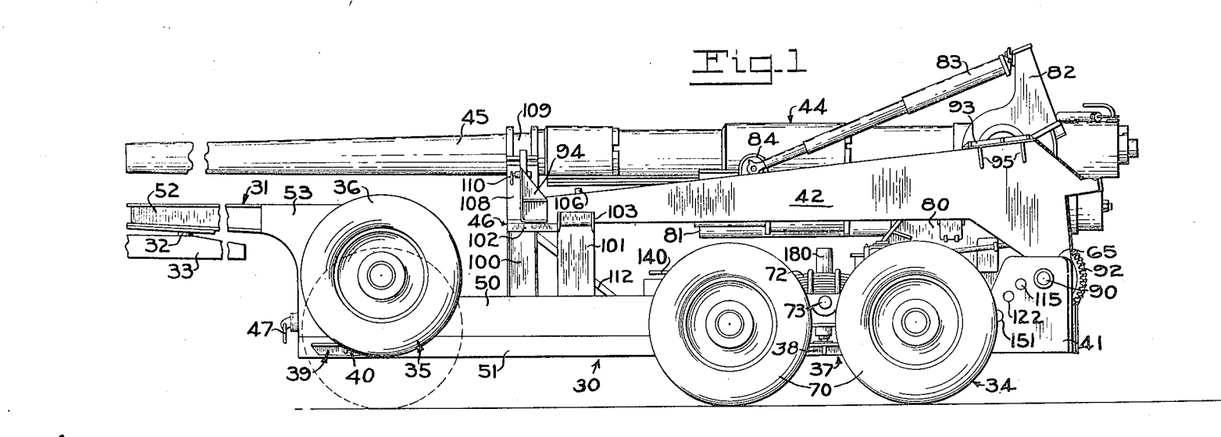
Fig. 1 is a side view of the carriage in travelling position, a portion of the prime mover being indicated as in position to support the weight of the forward portion of the carriage.

In the preferred form of the invention illustrated and described herein, the mobile gun carriage comprises a longitudinal main frame 30 having an upwardly and forwardly extending supporting portion 31 for the accommodation of a fifth-wheel structure 32 by means of which the carriage may be supported on a prime mover or the like, a fragment of which is indicated at 33 in Fig. 1. The weight of the rear portion of the carriage is supported, during travel of the carriage, by a rear rolling ground support preferably comprising a bogie or tandem rear wheel unit 34. The carriage is provided at its forward portion, just rearwardly of the fifth-wheel structure 32, with retractable means providing a front rolling ground support indicated generally by the numeral 35 and preferably comprising a pair of retractable front wheels 36 which, during travel of the carriage, assume the positions shown in Fig. 1.

When the carriage is emplaced at least a portion of the weight of the rear part of the carriage is supported by rear emplacement means indicated generally by the numeral 37 and preferably comprising a pair of retractable and extendible bogie plates 38. It is preferable that the bogie plates do not provide the entire support for the rear portion of the carriage but that the bogie unit 34 be permitted to contribute to the support of the carriage during emplacement thereof. The weight of the forward portion of the carriage when emplaced, is supported entirely by a forward or front emplacement means indicated generally by the numeral 39 and preferably comprising a pair of transversely spaced bed plates 40.

Figure 2:
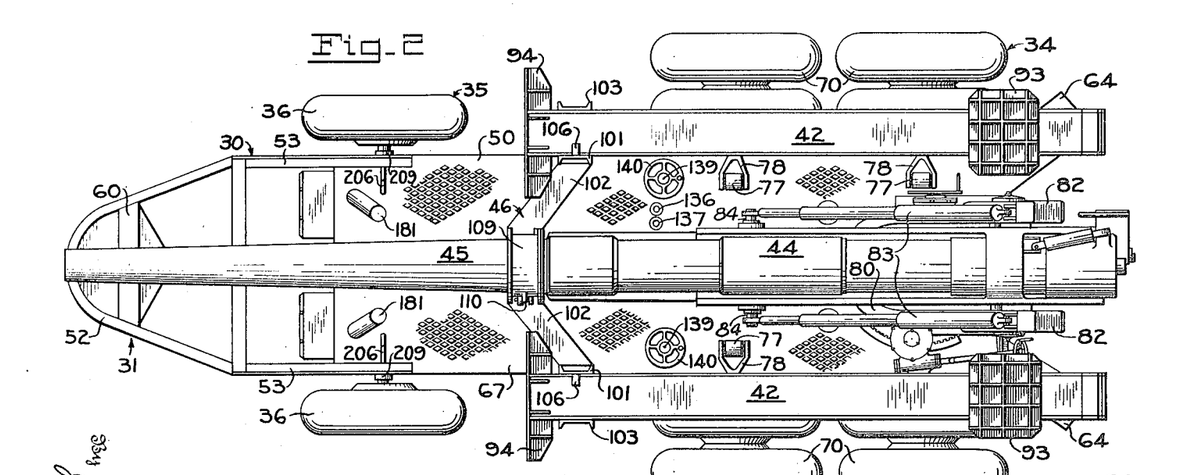
Fig. 2 is a plan view of the same.

The rear portion of the carriage frame 30 is provided with a rearwardly extending stub frame structure 41 for the pivotal support of a pair of trails 42. During travel of the carriage the trails 42 are folded forwardly and, in addition to being parallel to the frame 30, are parallel to each other as shown in Figs. 1 and 2. The pivot means for the mounting of the trails respectively include pivot axes so disposed with respect to the frame 30 and trails 42 that the trails, when extended rearwardly, assume the spread position of Fig. 3. In other words, the trails diverge rearwardly from the carriage frame 30.

The rear portion of the carriage frame is provided with a pintle well 43 (Fig. 3) for the mounting of the breech portion of a gun 44. The gun includes a gun tube 45 which, during travel of the carriage, extends forwardly of the carriage frame between the forwardly folded trails 42. The mounting of the gun in the pintle well 43 is such that the gun may have a 360° traverse, together with the necessary elevation and depression.

Figures 3, 6, 7, 8:
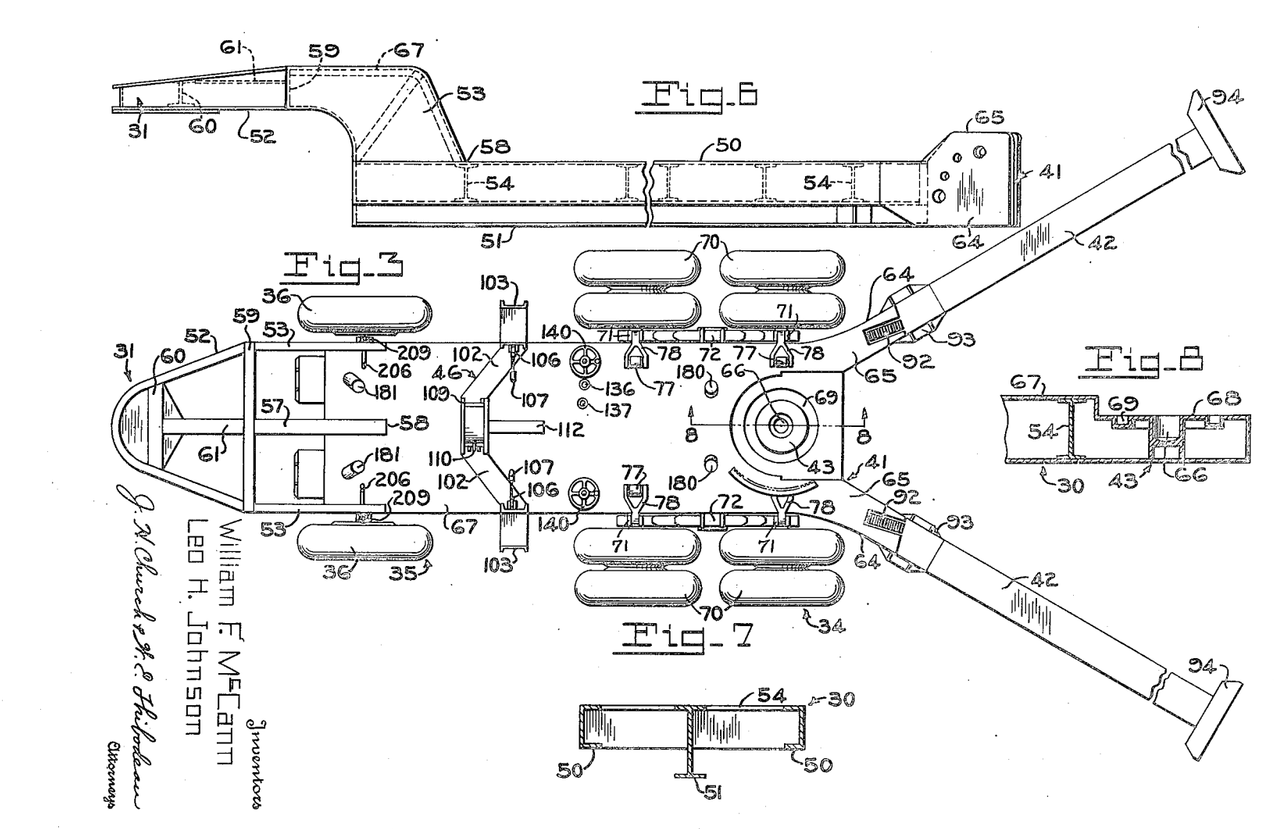
Fig. 3 is a plan view of the emplaced carriage, the gun being omitted.
Fig. 6 is a side view of the structure of Fig. 5.
Fig. 7 is a transverse cross sectional view taken on the line 7—7 of Fig. 5.
Fig. 8 is a longitudinal sectional view, on an enlarged scale, taken substantially on the line 8—8 of Fig. 3.
Figure 4:
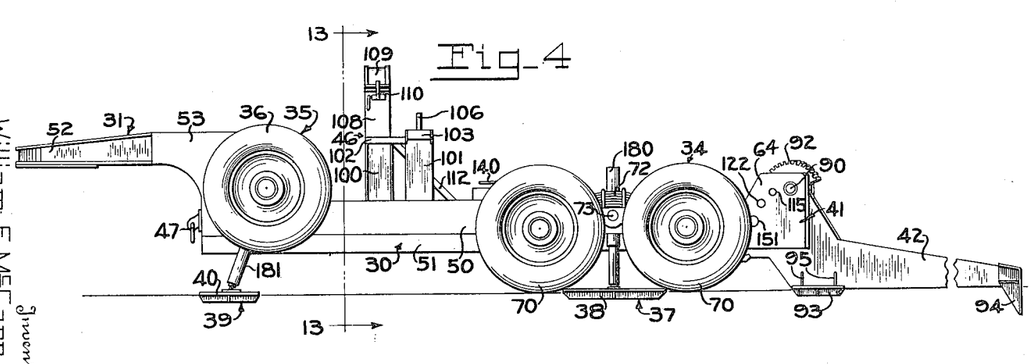
Fig. 4 is a side view of the arrangement of Fig. 3.

When the carriage is travelling, the trails 42 and gun tube 45 are locked in position by a supporting and locking structure indicated generally by the numeral 46 (Fig. 3).

The emplacement means, viz., the bogie plates 38, bed plates 40 and trails 42, are moved from firing position to travelling position by power means. The power means for the bed and bogie plates is preferably hydraulic (see Figs. 24 and 25) and the mechanism for operation of the trails includes conveniently arranged shafting and gearing (see Figs. 15, 16 and 17). An auxiliary towing hook or ring 47 is provided at the forward end of the carriage 30 to assist in maneuvering the carriage.

*Carriage frame (Figs. 5 to 8)*

The carriage frame 30 comprises a pair of longitudinally running transversely spaced side frame members 50 and an intermediate central longitudinally extending frame member or sill 51. The forward portion 31 of the frame—that portion which accommodates the fifth-wheel structure 32—comprises a frame member 52 bent in hairpin form and joined at its opposite rear ends to the side frame members 50 by a pair of rearwardly and downwardly extending side frame plates 53. The junctions of the parts thus far described are welded and a rigid unitary frame structure is provided. The central frame member 51 is substantially coextensive with the side frame members 50 and the three members are transversely interbraced throughout by a plurality of transverse frame members 54 and a plurality of diagonally running brace members 55, at the forward ends, and 56, at the rearward ends. These brace members are welded to the longitudinally running members and contribute to the rigid unitary structure of the frame. The side frame members 50 are preferably of channel form and the central member 51 is preferably an I-beam. The brace members 54, 55 and 56 are also preferably channels. It will be understood, of course, that the frame may be composed of angle bars or structural members of other shapes.

The forward or gooseneck portion 31, provided by the hairpin member 52 and attaching plates 53, is further braced and connected to the side frame members 50 and central member 51 by means of an upwardly and forwardly projecting central member 57 that is welded at its lower rear end to the central I-beam 51, as at 58, and at its forward end is rigidly connected, as by welding, to a transverse member 59 which is welded or otherwise rigidly secured at its opposite ends to the attaching plates 53. The bight portion of the hairpin frame member 52 is provided with a short transverse frame member 60, preferably welded thereto, and this member is welded intermediate its ends to one end of a relatively short centrally disposed brace member 61. The rear end of the member 61 is preferably welded to the transverse member 59 and in effect forms an extension of the central member 57. The structure is such that the members 51, 57 and 61 form what may be termed the backbone of the carriage frame 30.

Each forward diagonal brace 55 is provided with a vertical opening 62, the purpose of which will be set forth below in connection with the description of the front emplacement means. The crossed brace members 56 and associated transverse brace member 54 provide means for supporting the rear emplacement means and to this end the bracing structure at each side of the central member 51 is provided with a vertical opening 63.

The rear portion of the frame 30 is provided with what is herein termed a stub frame, designated by the numeral 41, the purpose of which is to mount the trails 42. The stub frame is preferably an integral part of the main frame 30 and is made up of a plurality of suitable plates and frame members welded together and to the frame 30 and adequately braced to provide a pair of rearwardly diverging supporting tongues 64. Each rearwardly extending tongue portion 64 is inclosed in part at its top portion by a housing 65, the opposite side walls of which are provided with a plurality of transversely aligned openings for the purpose of supporting bearings for the shafting of the trail-operating mechanism to be hereinafter described.

Just forwardly of its rear end, the frame 30 is provided with the pintle well 43 for the mounting of the gun 44. The central I-beam 51 and rearwardmost transverse brace 54 are centrally cut out to provide a vertical opening 66 which receives the pintle of the gun 44, as will hereinafter appear.

Substantially the entire frame 30 is overlaid with a gun platform 67, into which appropriate openings have been provided to accommodate portions of the carriage that extend upwardly from below. The pintle well 43 is recessed (Fig. 8) and an upper plate 68 is superimposed on the members 51 and 54 about the central opening 66. The plate 68 is provided with a circular bearing race 69 concentric with the central opening 66.

Figure 12:
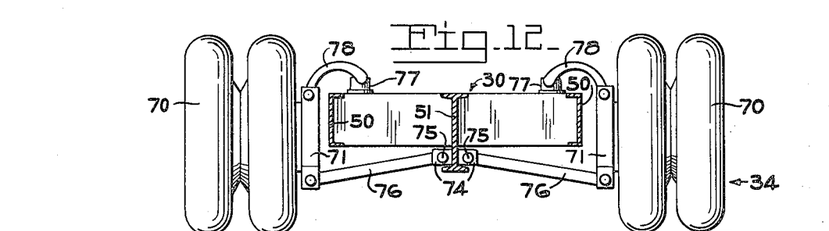
Fig. 12 is a transverse sectional view taken on the line 12—12 of Fig. 9 and showing the bogie suspension.
Figure 13:
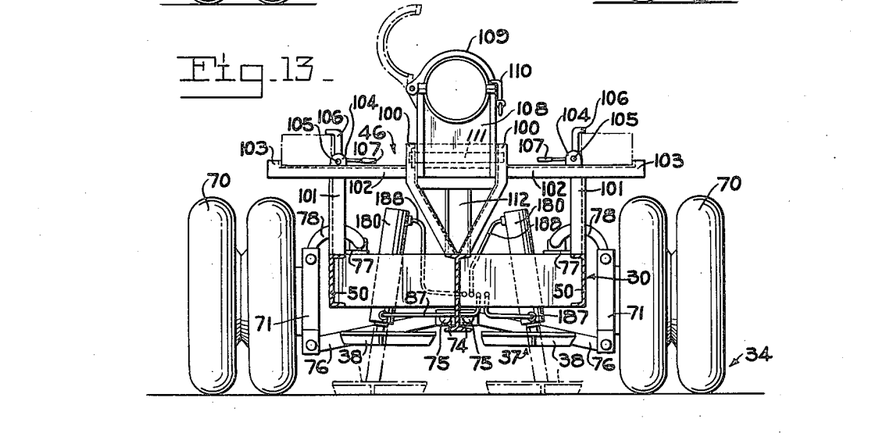
Fig. 13 is a transverse sectional view, on a slightly enlarged scale, taken along the line 13—13 of Fig. 4 and showing the supporting means for the rear portion of the carriage and the rear emplacement means or bed plates, the emplaced positions of the latter being shown in broken lines.

*Bogie unit (Figs. 9, 10 and 12)*

Figure 9:
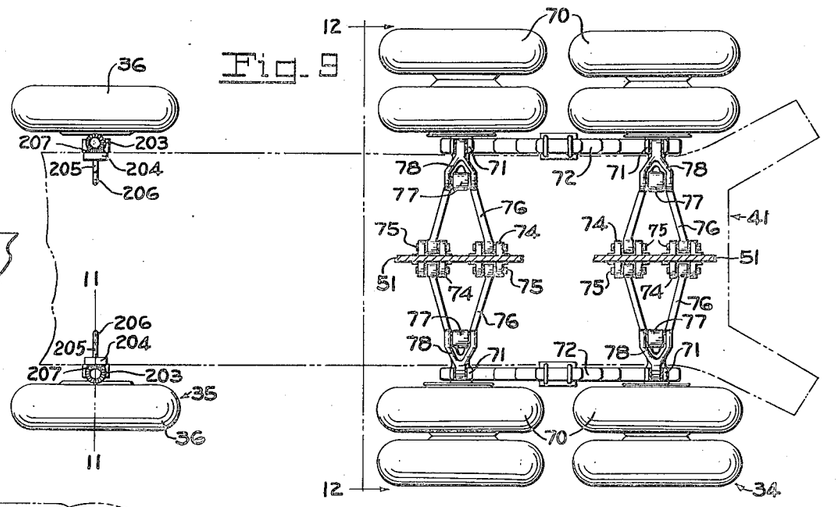
Fig. 9 is a plan view of the wheel-suspension system for the carriage, portions of the carriage frame being indicated in phantom and other portions in cross section.
Figure 10:
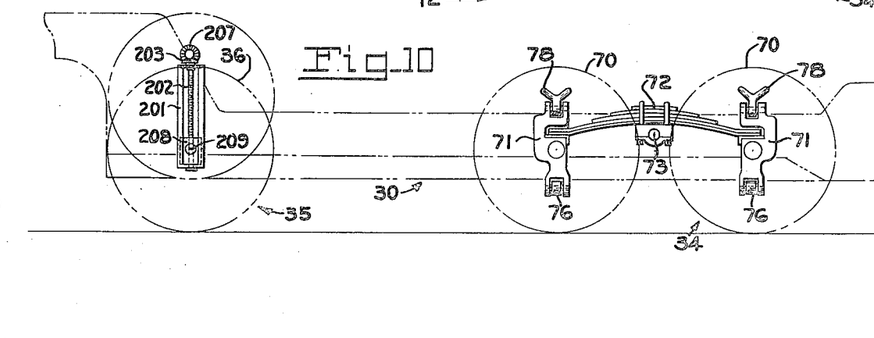
Fig. 10 is a side view of the structure of Fig. 9.
Figure 11:
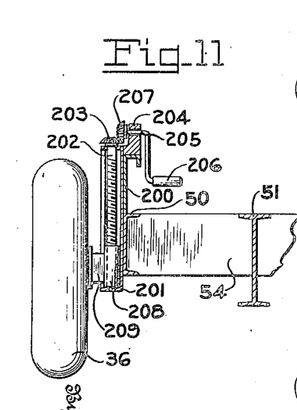
Fig. 11 is a transverse sectional view, on a slightly enlarged scale, taken on the line 11—11 of Fig. 9 and illustrating the means for positioning one of the front wheels.

The bogie 34 preferably comprises four sets of individually sprung dual wheels 70. Each dual wheel unit is carried on a stub axle mounted in a vertical housing member 71. Each pair of members on each side of the frame 30 is provided with spring seats which respectively receive the front and rear ends of a longitudinally running leaf spring 72. Each spring is pivotally supported intermediate its ends on a transverse shaft 73. The central I-beam 51 is provided with a pair of longitudinally spaced brackets 74 at its under side (Fig. 12) respectively in transverse alignment with the axles of the dual wheel units 70. Each bracket is provided at opposite sides with a pair of longitudinally running pivots 75 for the connection of the inner ends respectively of a plurality of transversely extending yokes 76. Each yoke is pivotally connected at its outer end on a longitudinal pivot axis to the respective wheel-supporting member 71. The upper portion of the frame 30 carries a plurality—in the present instance four—of shock absorbers preferably of the hydraulic double-acting type, herein indicated generally by the numeral 77. Each shock absorber unit includes a pivotally mounted transversely extending arm 78, the outer end of which is pivotally connected on a longitudinal axis to the upper end of the respective wheel-supporting member 71. The unit thus described provides for the free floating support of the rear end of the carriage and contributes to the increased mobility of the carriage over varying terrain.

*Gun and mount (Figs. 1, 2, 3 and 8)*

The rear end of the gun 44 is provided with a gun mount 80. The mount may be of conventional construction and is secured in place on the frame 30 by means of the pintle well 43 previously described. The bearing race 69 (Fig. 8) is adapted to carry ball or roller bearings of any suitable type for mounting the gun for the desired traverse. The mount 80 includes a cradle 81 on which the gun tube 45 is mounted. The breech portion of the gun 45 is provided with a pair of upstanding brackets 82 to which the upper ends of a pair of equilibrators 83 are connected, the forward or lower ends of the equilibrators being respectively connected to brackets 84 on the cradle 81. As previously stated, the position of the gun 44 during travelling of the unit is such that the gun tube 45 points forwardly.

*Trails and mounting thereof (Figs. 2, 3, 15 and 20 to 23)*

Figure 15:
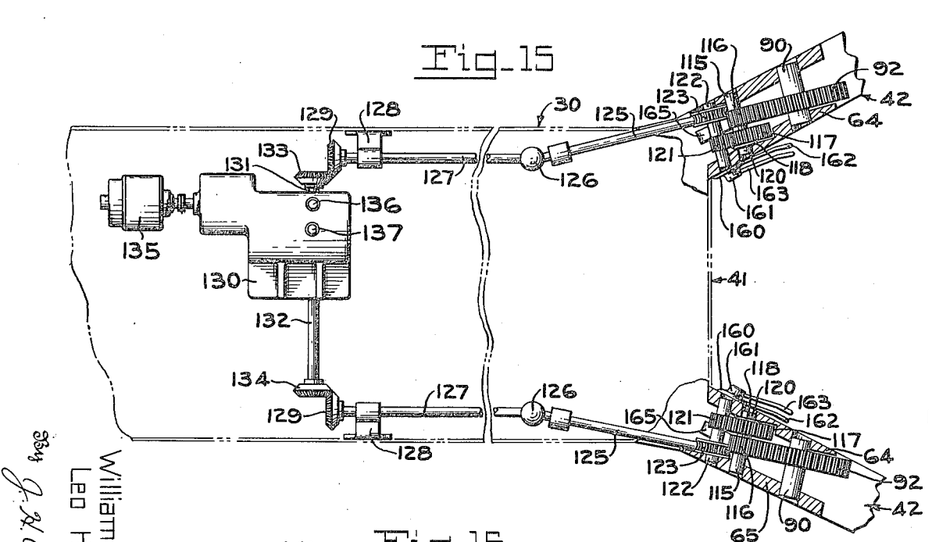
Fig. 15 is a plan view of the power mechanism for operating the carriage trails, portions of the carriage frame being shown in phantom and portions of the supporting structure being shown in cross section.

As previously stated, the stub frame structure 41 at the rear of the carriage frame 30 is provided with two laterally outwardly angled supporting portions or tongues 64. Each of these portions has journaled therein a short shaft 90. As best shown in Figs. 3 and 15, the axis of each shaft 90 is at an acute angle to the longitudinal axis of the carriage frame 30, the axes of the shafts being, of course, reversed. In the present instance the angle formed at the intersection of each shaft axis and longitudinal axis of the frame 30 is approximately 75°. The shafts 90 serve to pivotally mount the trails 42 respectively on the tongues 64.

Figure 20:
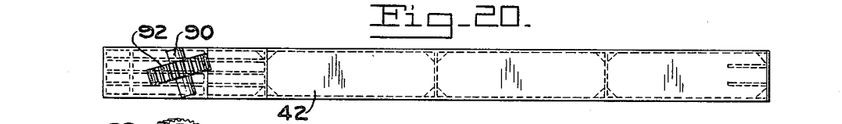
Fig. 20 is a plan view of one of the trails per se.
Figure 21:
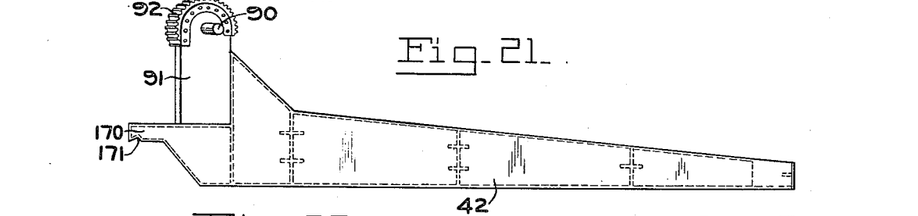
Fig. 21 is a side view of the same.
Figure 22:
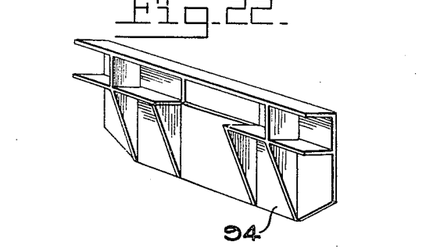
Fig. 22 is a perspective view of a trail spade per se.

As best shown in Figs. 20 and 21, each trail comprises a girder provided at its forward end with a rigid upstanding connecting portion 91 at the upper end of which is provided a gear segment or arcuate rack 92 concentric of shaft 90. The segment or rack is rigidly and preferably removably mounted on the connecting portion 91. Each trail is of rigid unitary construction, preferably welded throughout, and is provided at its forward end with a base plate 93 and at its rear end with a spade 94, these being shown in detail in Figs. 23 and 22, respectively. The spades and base plates are provided at their under surfaces with a plurality of cross webs to increase the effectiveness of the contact of the trails with the ground. The base plates are provided with a plurality of upstanding projections 95 by means of which they may be readily attached respectively to the trails 42.

Each shaft 90 is keyed or otherwise rigidly carried by the upstanding connecting portion 91 on the respective trail and opposite ends of the shaft project at opposite sides of the portion 91 so that the shaft may be journaled in the respective tongue 64. The shafts, then, serve to pivotally connect the trails for swinging movement about the shaft axes from an emplacement position, in which the trails are extended in spread relationship at the rear of the frame, to a travelling position, in which the trails are folded forwardly and lie parallel to each other at opposite sides of the longitudinally extending gun tube 45.

*Travelling lock for trails and gun tube (Figs 1 to 4, 13, and 14)*

As best shown in Fig. 3, the carriage frame 30 is provided intermediate its front and rear ends with the transverse supporting structure hereinbefore designated generally by the numeral 46. This structure comprises a central upstanding bracket portion 100 and a pair of transversely spaced upstanding bracket members 101. The upstanding members 100 and 101 are rigidly cross connected by a pair of transverse brace members 102, the junctions between the parts being preferably effected by welding. Each member 101 is provided at its upper end with a laterally extending trail-receiving member 103, these members being likewise included in the supporting structure 46 preferably by welding. Each member 103 is preferably turned up at its outer end to prevent lateral displacement of the trail received therein. The supporting structure 46 is provided adjacent the inner end of each trail-receiving member 103 with a pair of longitudinally spaced upstanding ears 104. Each pair of ears carries a longitudinal pivot 105 on which is mounted a laterally swingable hook member 106. The hook members 106 provide locking means for securing the trails in travelling position on the gun carriage. Each locking means is controlled by an operating handle 107. The arrangement between the parts 105, 106 and 107 is such that a locking action is effected when the handles 107 are moved inwardly or downwardly and so that release is accomplished when the handles are moved upwardly or outwardly. The means involved may include either cam mechanism or the handles 107 and pivot members 105 may be threaded together so that the locking members 106 are jammed longitudinally against the supporting ears 104. When the handles 107 are moved upwardly to release the hooks 106, the latter may be swung inwardly or downwardly toward the members 102 to provide ample space for the trails to move into or out of travelling position.

Figures 14, 18:
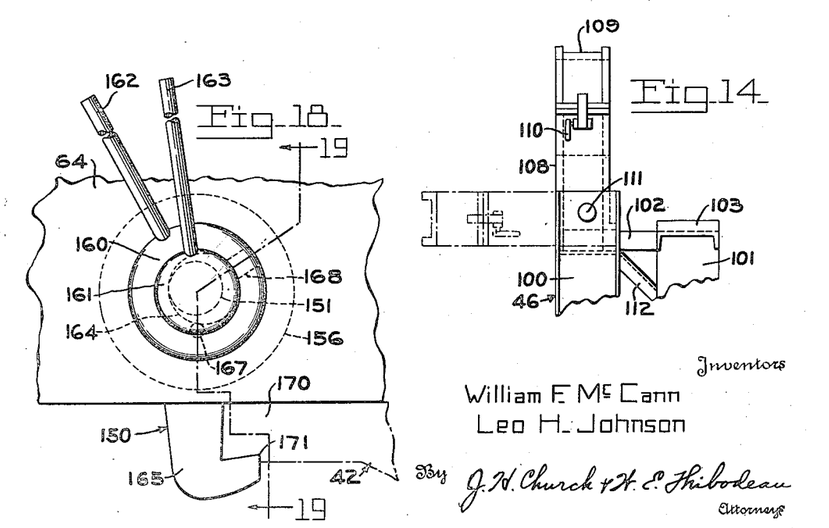
Fig. 14 is an enlarged fragmentary view in side elevation of the means for locking the gun tube in travelling position.
Fig. 18 is an enlarged fragmentary view of the means for locking the trails in extended position.

The central portion of the supporting structure 46 includes an upstanding gun-tube-receiving element 108, the upper portion of which is semicylindrical to receive the gun tube 45. A locking member 109 is hinged on a longitudinal axis at one side of the element 108 and is semicylindrical and complementary to the upper contour of the element 108 so that the gun tube is embraced thereby. Lock means of any conventional construction may be provided to lock the clamp or locking member 109 to the element 108, such lock being designated herein by the numeral 110. The element 108 is connected to the upstanding central structure 100 by means of a transverse pivot 111. As best shown in Fig. 14, the entire tube-receiving element 108, together with its locking member 109, may be swung forwardly to assume a horizontal position, as shown in broken lines in the figure referred to. The travelling lock for the gun tube is thus movable out of the path of free traverse of the gun tube 45 at zero elevation when the gun tube is swung so that it crosses the forward portion of the carriage.

A rearwardly and downwardly extending brace 112 is rigidly connected at opposite ends, as by welding, to the supporting structure 46 and central member 51 of the carriage frame 30 and completes the travelling support for the trails and gun tube.

*Trail-operating mechanism (Figs. 3 and 15 to 17)*

Each tongue 64 of the stub frame structure 41 is provided with a short shaft 115 that parallels the respective trail mounting shaft 90. This shaft has keyed thereto, or otherwise mounted for rotation therewith, a driving pinion 116. Opposite ends of the shafts 115 are journaled respectively in opposite side walls of the housings 65 formed respectively on the trail mounting tongues 64. Each shaft 116 carries thereon, for rotation with respect thereto, a larger gear 117, the inner face of which is provided as an internal clutch face complementary to an external clutch face formed on a clutch member 118 keyed to but axially slidable on the shaft 115. A compression spring 119 is interposed between the clutch member 118 and a collar 120, which is rigid on the shaft 115, and normally maintains engagement between the clutch member 118 and gear 117 so that the latter drives the shaft 115 under normal loads, the construction providing one form of well known slip clutch mechanism.

Each gear 117 is in constant mesh with and is driven by a driving pinion 121 keyed to a short shaft 122. The shafts 122 respectively parallel the shafts 90 and 115. Each shaft 122 is journaled in the housing 65 on the trail-mounting tongue 64 and has keyed thereto a worm wheel 123. Each worm wheel 123 is in constant mesh with and is driven by a worm 124 keyed to a generally longitudinally running drive shaft 125, opposite ends of which are suitably journaled on the carriage frame 30 and in the respective tongue 64. The forward end of each shaft 125 is connected by a universal joint 126 to a longitudinally extending power shaft 127. Each shaft 127 is suitably journaled on the carriage frame 30, as by a bearing 128 adjacent its forward end, and is provided at its extreme forward end with a bevel pinion 129, the connection between the shaft 127 and the bevel pinion 129 being effected in any conventional manner so that the shaft and pinion rotate conjointly.

The carriage frame 30 carries intermediate its front and rear ends a gear housing 130 which contains suitable change-speed transmission gearing (not shown) including a laterally extending right-hand drive shaft 131 and a left-hand laterally extending drive shaft 132. The drive shaft 131 has keyed to its outer end, for rotation therewith, a bevel pinion 133 in driving relation with the bevel pinion 129 on the right-hand longitudinal shaft 127. The shaft 132 is similarly provided with a bevel pinion 134 which is in driving relation with the bevel pinion 129 on the left-hand longitudinal shaft 127. Power means, preferably in the form of an electric motor 135, is provided at the input side of the transmission and provides power for driving the trail-operating gearing. The transmission housing 130 carries a pair of control levers 136 and 137 arranged in any conventional manner to drive the power shafts 131 and 132 individually or simultaneously to provide selective control of the trails 42.

Figure 16:
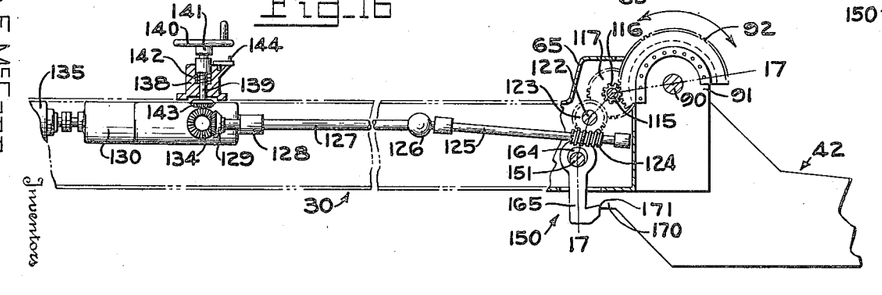
Fig. 16 is a side view of the mechanism shown in Fig. 15, the gearing for the trail mechanism being exposed.
Figure 17:
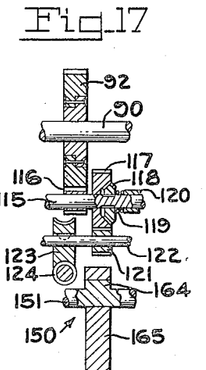
Fig. 17 is an angular sectional view taken on the line 17—17 of Fig. 16.

In the event of malfunctioning or failure of the power mechanism for the trails, the present invention provides individual manually operable means to accomplish folding and extension of the trails. As best shown in Fig. 16, the upper portion of the carriage frame 30 carries at each side thereof, at laterally spaced points thereon, an upstanding housing 138 in each of which is journaled a vertical shaft 139. Each shaft 139 is controlled by a hand wheel 140 keyed to or otherwise rigidly secured to its upper exposed end. Each housing 138 is axially recessed to receive a grooved collar 141 preferably formed integral with the hand wheel 140. A coiled compression spring 142 is located in the recess in the housing 138 and normally operates, through the medium of the collar 141, to move the shaft 139 and hand wheel 140 upwardly. During the upper position of the shaft and hand wheel, a bevel pinion 143, which is keyed to the lower end of the shaft 139, is out of mesh with the respective bevel pinion 129 at the forward end of the respective drive shaft 127. When it is desired to rotate either shaft 127 by the manual means, the hand wheel 140 and shaft 139 are moved axially downwardly so that driving engagement is effected between the bevel pinions 129 and 143. A locking member 144 is pivoted at the upper end of the housing 138 and is engageable with the grooved collar 141 to maintain the operating position of the hand wheel and shaft. It will be understood, of course, that operation of the trail mechanisms by the manually operable means is best accomplished by placing the transmission in neutral and operating the hand wheels 140 individually.

*Trail emplacement lock (Figs. 15 to 19)*

Each trail-mounting tongue 64 of the stub frame 41 is provided with means for locking the trails 42 in emplaced or firing position. These means are constructed in such manner as to provide a rigid connection between the trails 42 and the carriage frame 30. For general reference, each of these means is identified by the numeral 150.

Figure 19:
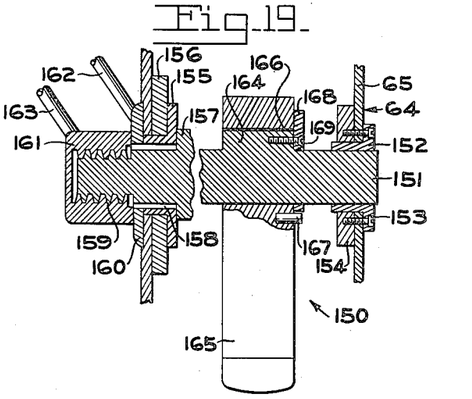
Fig. 19 is a vertical sectional view of the same, the view being taken on the line 19—19 of Fig. 18.

Each means 150 consists of a short transverse shaft 151 carried at opposite ends in opposite side walls of the respective housing 65. As best shown in Fig. 19, the outer end of the shaft 151 is carried in a removable bearing cap 152 secured to the proximate side wall of the housing 65 by a plurality of cap screws 153 threaded through the wall of the housing and into a reinforcing plate 154 at the inside of the housing wall. The opposite wall of the housing carries an internally splined cap 155 having a radial flange seated against a reinforcing plate 156 similar to the reinforcing plate 154. The inner end of the shaft 151 is provided with a radial flange 157 which abuts the inner face of the radial flange on the splined cap 155. The shaft 151 is externally splined, as at 158, adjacent the flange 157 and fits the internal spline in the cap 155. The extreme inner end of the shaft 151 is threaded, preferably with square or acme threads, as at 159. An internally splined washer 160 complements that portion of the spline 158 on the shaft 151 that extends inwardly through the reinforcing plate 156 and inner wall of the housing 65. The splined washer 160 and the internally splined cap 155 are relatively movable axially within limits, movement of the cap 155 being limited between the flange 157 on the shaft 151 and the interior face of the reinforcing plate 156; axial movement of the washer 160 is limited on the one hand by the external face of the inner wall of the housing 65 and on the other hand by a locking nut 161 internally threaded to fit the threads 159 of the shaft 151, the inner end of the nut 161 abutting the external face of the washer 160. The washer 160 is provided with an operating handle 162 by means of which the washer and shaft 151 may be rotated. The locking nut 161 is provided with a similar handle 163 by means of which the nut may be tightened on the shaft 151 to clamp the washer 150 and cap 155 together with the inner wall of the housing 65 therebetween; loosening of the nut 161 by reverse operation thereof releases the clamping action on the parts just described.

The shaft 151 is provided intermediate its ends and between the opposite walls of the housing 65 with an enlarged circular portion 164 having its axis eccentric to the axis of the shaft 151. A locking hook 165 is bored at 166 to loosely fit the eccentric portion 164. That portion of the hook 165 just below the shaft 151 is drilled transversely to receive a pin 167. A dog 168, secured to the eccentric portion 164 by a cap screw 169, operates, when the shaft 151 is rotated in a clockwise direction (as viewed in Fig. 18) by the handle 162 on the washer 160, to engage the pin 167 for swinging the hook 165 in a clockwise direction. As best shown in Fig. 18, the hook 165, when in locking position, engages the forward portion of the respective trail 42, the latter being specially provided with a forwardly projecting portion 170 having its under side notched as at 171 to receive the hooked end of the hook.

When the trail is extended rearwardly in emplaced or firing position, the portion 170 thereof will lie in position to have the notch 171 engaged by the hook 165. When the locking nut 161 is loosened, the hook 165 is free to engage the portion 170 of the trail 42, the design being such that the hook 165 will swing by gravity to the position shown in Fig. 18. When the shaft 151 is rotated by means of the handle 162 on the washer 160, the eccentric portion 164 will operate to move the hook 165 upwardly so that the hooked end thereof tightly engages and effects a clamping action on the forwardly projecting portion 170 on the trail 42. With the parts in this position, the lock nut 161 is tightened by means of the handle 163 and the shaft 151 is held against rotation by means of the clamping action effective between the cap 155, washer 160 and proximate wall of the housing 65.

When it is desired to release the shaft 151 for rotation in the opposite direction for the release of the trail portion 170, the nut 161 is loosened by reverse operation of the handle 163. The handle 162 may now be moved in the opposite direction to rotate the shaft 151 oppositely so that the eccentric 164 causes the hook 165 to move downwardly and out of clamping engagement with the trail portion 170. Continued rotation of the washer in a clockwise direction (as viewed in Fig. 18) effects engagement between the dog 168 on the eccentric 164 and the projecting pin 167, with the result that the hook is likewise moved in a clockwise direction and the lower end thereof is swung forwardly and entirely out of engagement with the projecting trail portion 170.

*Front and rear emplacement means and power means therefor (Figs. 4, 24 and 25)*

As previously stated, it is an object of this invention to provide power means for operating the front and rear emplacement means heretofore designated generally by the numerals 39 and 38 respectively. In the preferred form of the invention illustrated, the power means for operating the emplacement means involves an hydraulic system. It will be understood, of course, that any other suitable means may be employed to accomplish generally the same result; however, it has been found that the hydraulic system lends itself particularly well to the results desired.

Since the specific form of hydraulic system disclosed herein forms no part of the present invention except insofar as it is combined with other components of the carriage, no particular detail will be devoted to the illustration and description thereof, the drawing being somewhat schematic and the description being only sufficiently detailed to permit an understanding of the relationship of the hydraulic system to the emplacement means and the carriage construction.

As best shown in the figures referred to above, and as previously mentioned, the rear emplacement means 37 comprises a pair of transversely spaced bogie plates 38 adapted, when raised, to be positioned clear of the ground and adapted, when lowered, to engage the ground. The front emplacement means 39, comprising the pair of transversely spaced bed plates 40, is similarly characterized as to function and result.

Figure 24:
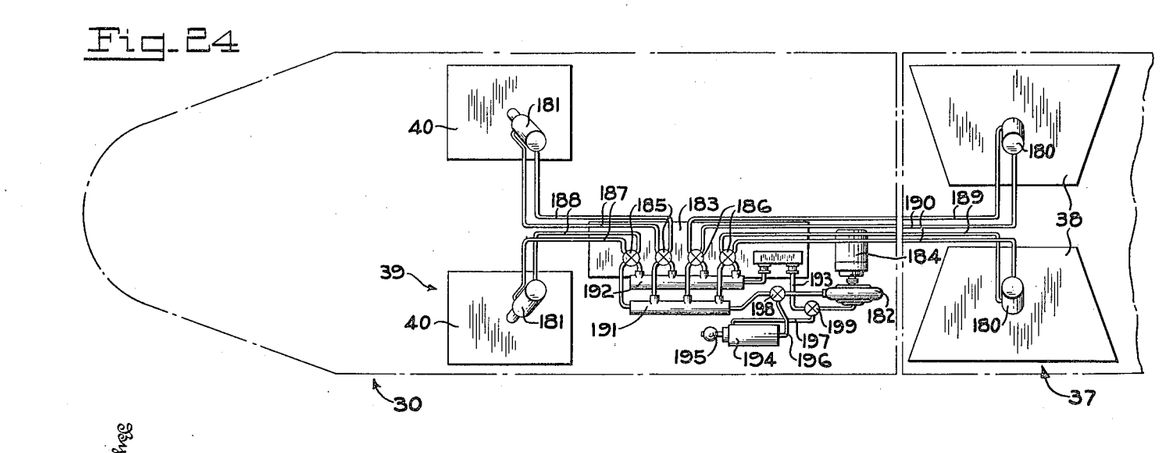
Fig. 24 is a schematic plan view of the bed and bogie plates and the power and control means for operating the same.
Figure 25:
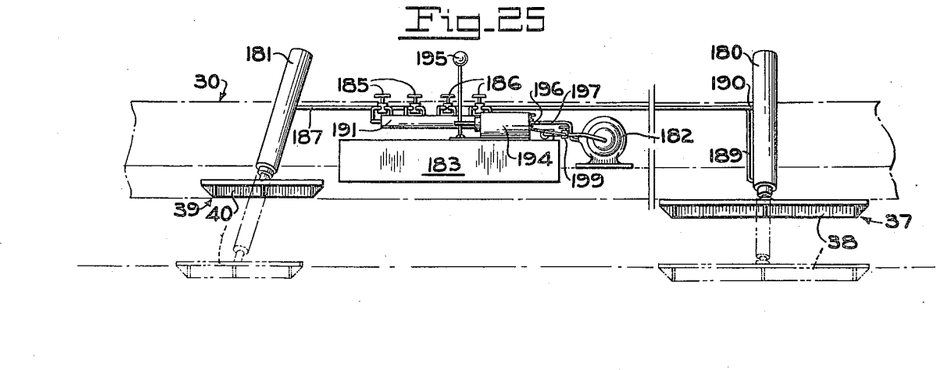
Fig 25 is a side view of the mechanism of Fig. 24.

Each of the bogie plates 38 of the rear emplacement means 37 is provided with a generally vertically disposed force-exerting element, herein comprising a two-way hydraulic cylinder and piston unit 180. Each of the bed plates 40 of the front emplacement means 39 is provided with a similar two-way hydraulic cylinder and piston unit 181. The carriage frame 30 carries at a point thereon between the front and rear emplacement means, the necessary components of a fluid system, which may employ either air, oil or any other suitable medium. As shown in Figs. 24 and 25, the carriage frame carries a suitable pump 182, a fluid reservoir 183 and a motor 184 for driving the pump 182. The fluid system further includes a pair of four-way valves 185 and a second pair of four-way valves 186. One of the valves 185 is suitably connected by fluid lines 187 and 188 to the lower and upper ends respectively of one of the front two-way cylinders 181; the other valve 185 is similarly connected to the other front cylinder. One of the valves 186 is appropriately connected by fluid lines 189 and 190 to the lower and upper ends respectively of one of the rear cylinders 180; the other valve 186 is similarly connected to the other rear cylinder. Each of the valves 185 and 186 is connected by conduit means 191 to the pressure side of the pump 182 and each of these valves is connected by conduit means 192 to the intake side of the reservoir 183. Conduit means 193 connects the output side of the reservoir 183 with the intake side of the pump 182.

The valves 185 and 186 may be of any typical four-way type, the operation of which is well known to those skilled in the art. The arrangement is such that each of the valves 185 and each of the valves 186 may be individually operated to direct fluid under pressure to either the lower or upper end of the two-way cylinder to which it is connected, the controlled flow being such that fluid under pressure passes from the pump 182 through the conduit 191, through an appropriate valve to one end of a cylinder and returns through the valve and through the conduit means 192 to the reservoir 183. It will be understood, of course, that any number of different fluid systems and control therefor may be employed. The foregoing is illustrated schematically as a simple form of fluid system for the purposes of illustration in connection with the present invention.

As an adjunct to the hydraulic system just described, there is provided a manually operable pump 194 which is provided with an operating handle 195 and which is connected by fluid lines 196 and 197 into the output and return lines 191 and 193, respectively, of the system. Suitable valves 198 and 199 are provided for cutting out the pump 182 in the event of failure thereof.

Figure 5:
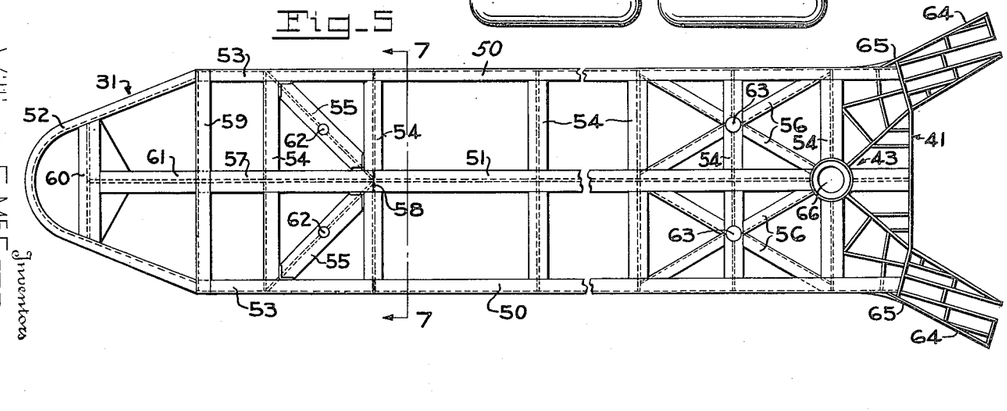
Fig. 5 is a plan view of the carriage frame per se.

The cylinders 180 and 181 are suitably supported or carried by the carriage frame 30 and project generally vertically through the openings 63 and 62, respectively, previously described (Fig. 5).

Retractable front wheels (Figs. 1, 4, 9, 10 and 11)

As described above, the front rolling ground support, generally designated by the numeral 35, comprises a pair of transversely spaced, retractable front wheels 36 capable of sustaining the weight of the forward portion of the carriage when the carriage is disconnected from and unsupported by the prime mover or the like. These wheels are mounted for movement from a ground-engaging position to a position clear of the ground when the carriage is travelling. Although the carriage is normally emplaced by means of the trails 42 and rear and front emplacement means 37 and 39, when it is disconnected from the prime mover, it is often desirable to lower the front wheels 36 to ground-engaging position so that the carriage may be maneuvered for short distances.

In order that the front wheels 36 may be moved between a position clear of the ground and a position in engagement with the ground, the front end of the carriage 30 is provided with a pair of manually operable means—one for each wheel—for raising and lowering the wheels. Since these mechanisms are alike, only one will be described, it being understood that the description pertains likewise to the other.

Each of the longitudinal frame members 50 is provided at its forward end, adjacent its junction with the front transverse frame member 54, with an upstanding plate 200, to the outer face of which is rigidly secured a vertical channel guide 201. A vertical screw 202 is journaled at its upper and lower ends respectively in the upper and lower ends of the channel guide 201 and the upper end of the screw has keyed thereto a bevel pinion 203. The upper end of the supporting plate 200 is provided with a bearing 204 which is bored on a transverse axis to journal a short shaft 205 preferably formed integral with an operating crank 206. The outer end of the shaft portion 205 has keyed thereto a bevel pinion 207 in constant mesh with the bevel pinion 203 at the upper end of the screw 202. The channel guide 201 carries for vertical sliding therein a wheel block 208. This block is provided with a spindle 209 on which the wheel 36 is rotatably carried. The sliding wheel block 208 is internally threaded to receive the screw 202. Rotation of the bevel pinion 207 in either direction by means of the crank 206 will rotate the screw 202 and will raise or lower the wheel 36.

OPERATION AND USE

When the carriage is assembled and arranged for mobile cross-country travelling, the components thereof assume the positions illustrated in Figs. 1 and 2, wherein it is shown that the weight of the carriage is distributed between the rear wheels 70 and the rear of the prime mover 33. The trails are folded forwardly and lie parallel alongside the forwardly extending gun tube 45, these three elements being locked in their travelling positions by means of the travelling lock mechanisms provided therefor. Because of the compactness of the unit and its flotation as a semi-trailed load, it is easily transported and may be moved rapidly from one position to another, all in keeping with varying conditions of terrain and tactical requirements.

Figure 23:
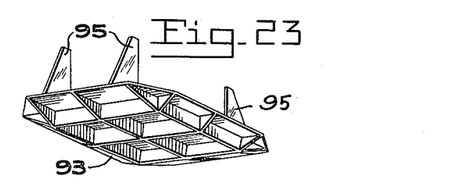
Fig. 23 is a perspective view of a trail base plate per se.

When it is desired to emplace the carriage and arrange it for firing, the hydraulic mechanism of Figs. 23 and 24 is operated to move the front and rear emplacement means 39 and 37 to ground-engaging position. By means of the individual control valves provided for the front emplacement means, the front plates 40 may be emplaced temporarily as jacks to raise the front of the carriage so that the prime mover may be moved free thereof, after which the carriage may be leveled. It is desired, in emplacing the carriage, that the bogie plates 38 do not support the entire weight of the rear end of the carriage; instead, it is desired only that the wheels 70 be relieved of a part of the carriage weight and that the rear of the carriage be supported through the combined effort of the wheels 70 and the rear emplacement means 37.

In the event that conditions are such that the terrain is uneven, level emplacement of the carriage may be accomplished by means of the varying adjustments of the emplacement means permitted by the individual control valves 185 and 186, by means of which greater or lesser quantities of fluid may be supplied to individual cylinders as needed. Similarly, the trails may be moved to emplacement condition either simultaneously or individually and in either case separate adjustments of either can be accomplished.

In the event that it is desired to move the carriage for relatively short distances without remounting the carriage on the prime mover, the front wheels 36 may be lowered to the ground.

It will be noted from an examination of Figs. 2 and 3 that the mounting of the trails is such that the trails, when folded, occupy a space of relatively slight transverse width but, when extended, are spread to such an extent that the rear or outer ends thereof are spaced apart a distance considerably greater than the overall width of the carriage. It will be appreciated that this construction provides for increased stability of the unit when emplaced and for compactness of arrangement with the carriage for travelling.

Various other constructional, functional and operational details will undoubtedly occur to those skilled in the art. Likewise, many alterations and modifications may suggest themselves. It will be understood, of course, that the description and drawings herein pertain only to a preferred embodiment of the invention and that many modifications and alterations may be accomplished without departing from the spirit and scope of the invention as defined in the appended claims.

While the invention has been illustrated with reference to a gun carriage this is mainly for illustrative purposes and is not to be considered so limiting the invention since other modes of application in operation are as well adapted to the improvement and in general it finds its utility in load handling vehicles in general.

What is claimed is:

1. In a gun carriage, an elongated rectangular vehicle frame having rearwardly and laterally projecting extensions at the rear corners thereof, first and second elongated trails, means pivoting each trail to a respective extension on a normally horizontal axis inclined at less than 90° to the longitudinal axis of the frame, whereby each trail may be folded from a rearwardly and laterally outward extended position to a folded position on and extending forwardly along a respective side of said frame in substantial parallelism with the longitudinal axis thereof, a pintle well formed in said frame adjacent the rear end thereof between said extensions, a gun tube, means mounting said tube on said pintle well for pivotal movement in train through 360° about a normally vertical axis, and for elevation about a normally horizontal axis, a supporting structure fixed to said frame in transverse, generally horizontal upstanding relation therewith forwardly of said pintle well, means carried by said structure at opposite ends thereof to support and lock the respective trails in folded position, and a gun tube support centrally located on said structure and pivotable on a horizontal axis from an upstanding position for receiving and supporting the gun tube in horizontal, forwardly-extending traveling position, to a downwardly folded position out of the path of said gun tube when said tube is traversed through the forwardly-directed position.

2. In a gun carriage, an elongated vehicle frame generally rectangular in plan and having a rearwardly and laterally outwardly projecting extension at each rear corner thereof, first and second elongated trails, means connecting each trail at one end thereof to a respective extension of said frame for pivotal movement about a normally horizontal axis at less than 90° to the longitudinal axis of said frame, from a first position extended rearwardly and outwardly of said frame, to a second position in which each trail is folded on said frame in generally horizontal forwardly-extending position along a respective side thereof, a gun tube, means mounting said tube on said frame at the rear central portion thereof for pivotal movement in train and elevation, a support secured to the central portion of said frame in transverse relation thereto and including end portions adapted to support and lock said trails in said second position and a central portion adapted to support said tube in horizontal forwardly-directed traveling position, said central portion being pivotably about a horizontal transverse axis from an upstanding gun-supporting position to a downwardly folded position out of the path of traverse of said gun when at zero elevation.

3. A gun carriage as recited in claim 2, a four-wheeled bogie providing a rolling ground support for the rear end of said frame, said bogie having pairs of wheels in tandem at each side of said frame, the front end of the frame terminating in an upwardly and forwardly extending portion adapting the frame to be horizontally supported and the remainder of the load of the carriage to be supported by automotive tractive means, emplacement plates at the respective sides of the front portion of the frame, emplacement plates at the respective sides of the rear portion of the frame between the tandem wheels, means mounting each said plate for movement relatively to said frame from a ground engaging position to a retracted position, and hydraulic power means carried by said frame and operable to so move each said plate individually.

WILLIAM F. McCANN.
LEO H. JOHNSON.

REFERENCES CITED

The following references are of record in the file of this patent:

UNITED STATES PATENTS

| Number | Name | Date |
|---|---|---|
| 1,297,445 | Christie | Mar. 18, 1919 |
| 1,310,142 | Schneider | July 15, 1919 |
| 1,321,774 | Schneider | Nov. 11, 1919 |
| 1,426,219 | Roy | Aug. 15, 1922 |
| 1,473,628 | Joyce | Nov. 13, 1923 |
| 1,483,151 | Zimmerman | Feb. 12, 1924 |
| 1,483,169 | Filloux | Feb. 12, 1924 |
| 1,762,915 | Davis | June 10, 1930 |
| 1,858,495 | Goebert et al. | May 17, 1932 |
| 2,015,100 | Cederstrom | June 6, 1935 |
| 2,043,989 | Conlon | June 16, 1936 |
| 2,166,564 | Atwood et al. | July 18, 1939 |
| 2,232,095 | Coder | Feb. 18, 1941 |
| 2,313,877 | Joyce | Mar. 16, 1943 |
| 2,379,991 | Riboud | July 10, 1945 |
| 2,392,506 | Rossmann | Jan. 8, 1946 |
| 2,415,024 | Allen | Jan. 28, 1947 |

FOREIGN PATENTS

| Number | Country | Date |
|---|---|---|
| 8,654 | Great Britain | Apr. 3, 1902 |
| 532,682 | France | Nov. 18, 1921 |
| 800,842 | France | July 20, 1936 |
| 825,916 | France | Mar. 17, 1938 |
| 495,504 | Great Britain | Nov. 15, 1938 |